(12) United States Patent
Stringer

(10) Patent No.: US 6,273,435 B1
(45) Date of Patent: Aug. 14, 2001

(54) TRAILER WITH NON-TILTING MOVABLE BED

(75) Inventor: Matthew D. Stringer, Archbold, OH (US)

(73) Assignee: bil-jax, inc., Archbold, OH (US)

( * ) Notice: Subject to any disclaimer, the term of this patent is extended or adjusted under 35 U.S.C. 154(b) by 0 days.

(21) Appl. No.: 09/421,735

(22) Filed: Oct. 20, 1999

Related U.S. Application Data (60) Provisional application No. 60/118,885, filed on Feb. 5, 1999.

(51) Int. Cl.[7] .................................................. B60S 9/00
(52) U.S. Cl. ............................ 280/6.151; 280/6.155; 280/43.11; 280/43.14; 280/43.18; 280/43.2; 280/656; 280/704; 280/789
(58) Field of Search ..................... 280/6.151, 6.155, 280/656, 43.11, 789, 704, 43.18, 43.14, 43.2, 43.24, 43.23

(56) References Cited

U.S. PATENT DOCUMENTS

| | | | |
|---|---|---|---|
| Re. 32,736 | * | 8/1988 | Lovell ............................ 280/43.23 |
| 2,515,379 | * | 7/1950 | Paine . |
| 2,637,564 | * | 5/1953 | Stratman . |
| 2,706,102 | * | 4/1955 | Cresci . |
| 2,762,631 | * | 9/1956 | Entz . |
| 2,853,308 | * | 9/1958 | Schramm . |
| 2,867,444 | * | 1/1959 | Henning et al. . |
| 2,885,216 | * | 5/1959 | Browning . |
| 2,967,725 | * | 1/1961 | Roberson ....................... 280/43.23 |
| 3,056,610 | * | 10/1962 | Massey . |
| 3,065,871 | * | 11/1962 | Schramm . |
| 3,361,440 | * | 1/1968 | Green . |
| 3,866,935 | * | 2/1975 | Nelson . |
| 4,003,583 | * | 1/1977 | Stanzel .......................... 280/43.23 |
| 4,058,325 | * | 11/1977 | Schramm ....................... 280/43.11 |
| 4,063,745 | * | 12/1977 | Olson ............................... 280/42.3 |
| 4,077,642 | * | 3/1978 | Clark ................................. 280/43.2 |
| 5,288,197 | * | 2/1994 | Harris ............................. 280/43.24 |
| 5,433,578 | * | 7/1995 | Honan ............................... 280/704 |
| 5,474,416 | | 12/1995 | Rogge et al. . |
| 5,536,131 | | 7/1996 | Behr . |
| 5,810,544 | | 9/1998 | Wellman . |
| 6,019,565 | * | 2/2000 | Gesuale ..................... 280/43.23 X |

\* cited by examiner

*Primary Examiner*—Lanna Mai
*Assistant Examiner*—Toan C To
(74) *Attorney, Agent, or Firm*—Emch, Schaffer, Schaub & Porcello Co., L.P.A.

(57) ABSTRACT

A trailer for use in transporting a load from one area to another area has a frame and a bed operatively mounted to the frame which is capable of being moved from a first or lowered position to a second or elevated position in a substantially vertical manner or nontilting manner. At least one lifting mechanism is operatively connected to the bed, which applies the greatest force for lifting the bed from the lowered position to the elevated position at the beginning of the lift, rather than at an end or midpoint of the lift. At least one over-center latching mechanism secures the bed to the frame when the bed is in the elevated position.

12 Claims, 6 Drawing Sheets

TRAILER WITH NON-TILTING MOVABLE BED

This application claims benefit of Provisional Ser. No. 60/118,885, filed Feb. 5, 1999.

BACKGROUND OF THE INVENTION

The present invention is directed to a trailer which is especially useful in lifting and transporting pieces of equipment. The present invention is an improvement over a prior art trailer sold by bil-jax, Inc. of Archbold, Ohio including the Escalate Trailer Workforce® models ET 1500 and ET 2000. The prior art trailer is designed allow a piece of equipment to be transported from one place to another by being hitched to a vehicle. The prior art trailer has a bed which is lowered to the ground using a winch operation such that the bed does not tilt when being raised or lowered. When using the prior art trailer, a piece of equipment is positioned or moved onto the lowered bed. The bed is then raised by a winch into an elevated position so that the bed clears the ground. Operation of this prior art trailer included the raising or lowering by using a hand or automatic winch and cable which pulled the bed into a raised position. The prior art trailer required a great amount of power to raise the bed and the equipment thereon to the raised position. Accordingly, the person operating the trailer must exert extreme amount of effort to raise or lower the trailer.

The prior art trailer also was held in position by a standard type of toggle retaining latch to secure the bed to the frame once the bed was in the raised position. It is very important that the bed be very securely held in the raised position such that the equipment being hauled or transported is not damaged and that no injury occurs to the trailer operator. Such equipment often includes heavy and expensive equipment such as personnel lifts, trenchers, compactors, generators, appliances, tillers, welding equipment, lawn mowers, and the like. These pieces of equipment must be able to be securely held on the bed and not inadvertently become detached when the trailer is in use.

The primary object of the present invention is to provide an improved trailer where a bed can be raised and lowered in a non-tilting manner and can be used to transport heavy pieces of equipment. The trailer of the present invention includes a lifting mechanism and a passive locking mechanism which provide the operator with a great mechanical advantage thus reducing the amount of force required to raise and lower the bed.

In addition, the lifting mechanism and the locking mechanism together provide a trailer system having safety and energy conserving features.

SUMMARY OF THE INVENTION

The present invention is a trailer that can be operated by one person to move heavy and awkward loads or equipment and to transport or tow the load or equipment behind a vehicle.

The improved trailer of the present invention has a frame and at least one wheel and axle assembly on opposing sides of the frame. The wheel and axle assemblies allow the trailer to be readily moved from one location to a different location. The trailer also has a hitching mechanism so that the trailer can be towed by a suitable vehicle.

The trailer also has a moveable bed operatively attached to the frame. The bed has a bottom surface or deck and opposing sides which extend in a vertical direction from the deck. The sides of the moveable bed include at least one, and preferably a plurality of, cam follower tracks which extend at an angle from the deck to a top railing. The cam follower tracks matingly engage opposing cams mounted on the frame. The moveable bed is operatively connected to a lifting mechanism which raises and lowers the bed in a non-tilting manner. In a preferred embodiment, the lifting mechanism is operatively connected such that there is approximately a 2 to 1 mechanical disadvantage which advantageously harnesses the power potential of the lifting mechanism. The lifting mechanism which utilizes a small stroke and can be of a small size and still have sufficient power to raise and lower heavy loads.

The lifting mechanism is attached to the bed with a lever and a connecting bar. The connecting bar is pivotally attached at a first end to the bed and pivotally attached at a second end to a first end of the lever. The lever is pivotally connected at a midpoint to the lifting mechanism. The connecting bar attaches the lever to the bed in such a manner that the greatest force is exerted at the beginning of the lift, rather than at the end or midpoint of the lift. This feature reduces the risk of overloading the trailer. According to the present invention, it is not reasonably possible to partially raise any loads in excess of the rating of the lifting mechanism since the greatest force is exerted at the beginning of the lift.

The improved trailer of the present invention also includes a passive securing mechanism which is designed to lock the bed in place when the bed is in a fully raised position. The securing mechanism has a camming latch mechanism which engages a portion of the frame. The securing mechanism is held in place with a restraining mechanism, such as a spring, when the securing mechanism is in a latched position, thus reducing the risk of the securing mechanism becoming unlatched without an outside force being applied to the securing mechanism. When the bed is in a raised position, the bed is resting on level portions of cam follower tracks of the bed. The operator applies a force on the securing mechanism to release the securing mechanism from the bed. The bed is pushed back into angled portions of the cam follower tracks, thereby allowing gravity to lower the bed. The securing mechanism gives the operator a mechanical advantage, thus reducing the force required to lower the bed.

During operation of the trailer, a bed is lowered to the ground in a non-tilting manner and the load or equipment is easily positioned on the bed. The bed is raised in a non-titling manner to an elevated position so that the trailer can be attached to any suitable vehicle for towing.

The improved trailer of the present invention thereby provides a lifting and securing system which has additional safety and energy conserving features. One safety feature is a two-handed requirement in order to lower the bed. One hand of the operator is on the securing mechanism while the other hand is operating a power switch. Another safety feature is that the bed is triplely secured when in a raised position by, first, having the level portions of the cam follower tracks hold the bed in an engaged position; second, the over-center securing mechanism holds the bed in a locked position on the frame; and, third, the lifting mechanism is in a "bottomed out" or fully engaged position such that the lifting mechanism can not move any further, thereby holding the bed in a raised position.

Still another safety feature is the lifting mechanism which is operated in a unidirectional manner such that the lifting mechanism is only powered in one position; i.e., when raising the bed. The unidirectional power safety feature eliminates the risk of the operator powering down the bed without unlatching the securing mechanism, thus preventing any damage to the securing mechanism and/or the operator.

The main energy conserving feature is the unidirectional lifting mechanism which uses power in the up position, while allowing gravity to lower the bed. In a preferred embodiment, the lifting mechanism has a flow restrictor type device on a hydraulic cylinder to control the downward speed of the bed. The unidirectional lifting mechanism uses approximately one-half of the total energy of a power up/power down hydraulic cylinder.

DESCRIPTION OF THE PREFERRED EMBODIMENT

A trailer, according to the present invention, is generally indicated in the drawings by the reference numeral 10. The trailer includes a frame 11 having first and second longitudinally extending frame members 12, rails 14, and a support bar or end 16. In the embodiment shown, the frame members 12 are in opposed parallel relationship. One end of each of the frame members 12 is operatively connected to longitudinally extending rails 14 which converge as the rails extend from the frame members 12. The rails 14 terminate at an apex, or first end, 16. The frame members 12 include a plurality of cam members 18 positioned in a spaced apart relationship along the longitudinal frame members 12. Mounted on the frame members 12 is a bed 20 which includes a deck 22, angled support portions 24 and cam follower tracks 26. Individual cam follower tracks 26 matingly engage corresponding cam members 18 on the frame members 12. Each cam follower track 26 defines a horizontal section 27 which is adjacent the deck 22, as best seen in phantom in FIG. 1. The bed portion 20 of the invention is found in the bil-jax, Inc. Escalate Trailer 1500 and 200 Models. Since a standard and commercially available bed is utilized, features of this bed will not be described in detail.

Figure 1:
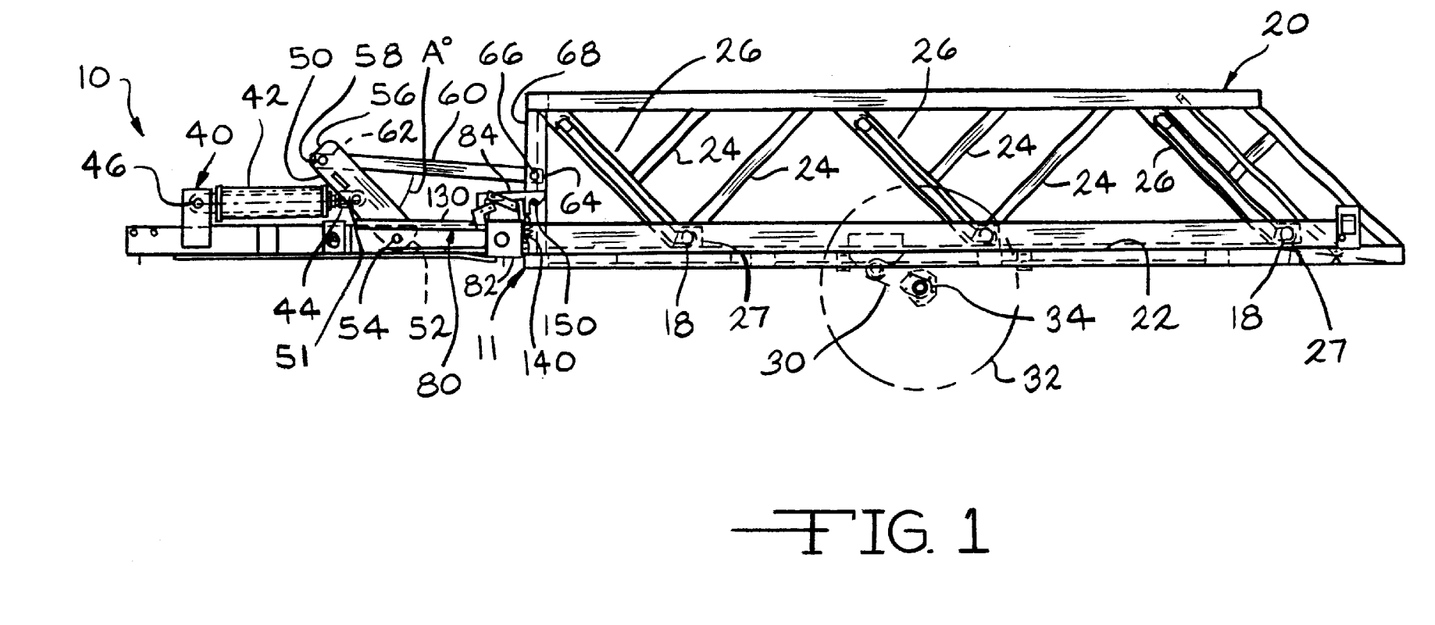
FIG. 1 is a side elevation view of a trailer frame including a bed in a first or elevated position.
Figure 2:
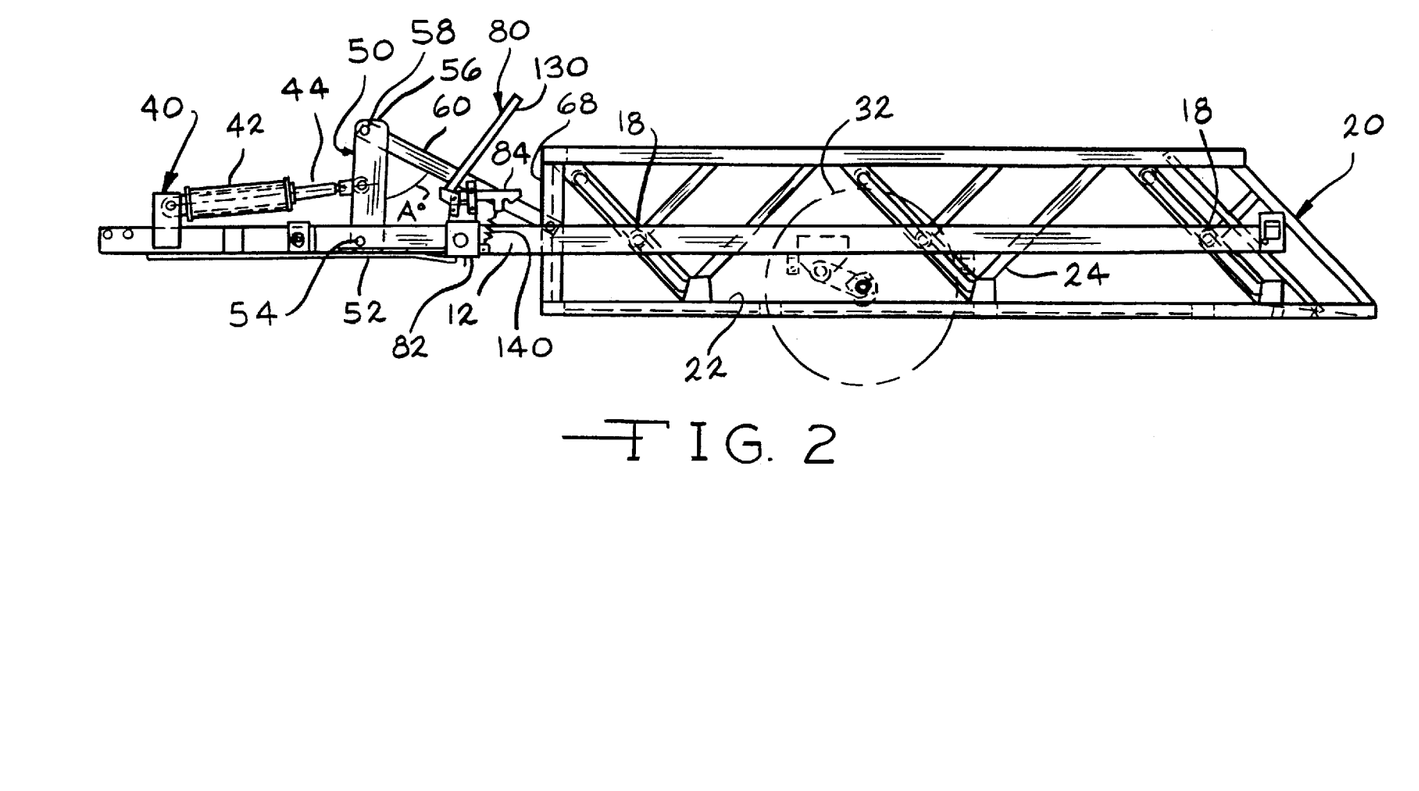
FIG. 2 is a side elevation view of a trailer frame including a bed in a partially lowered position.
Figure 3:
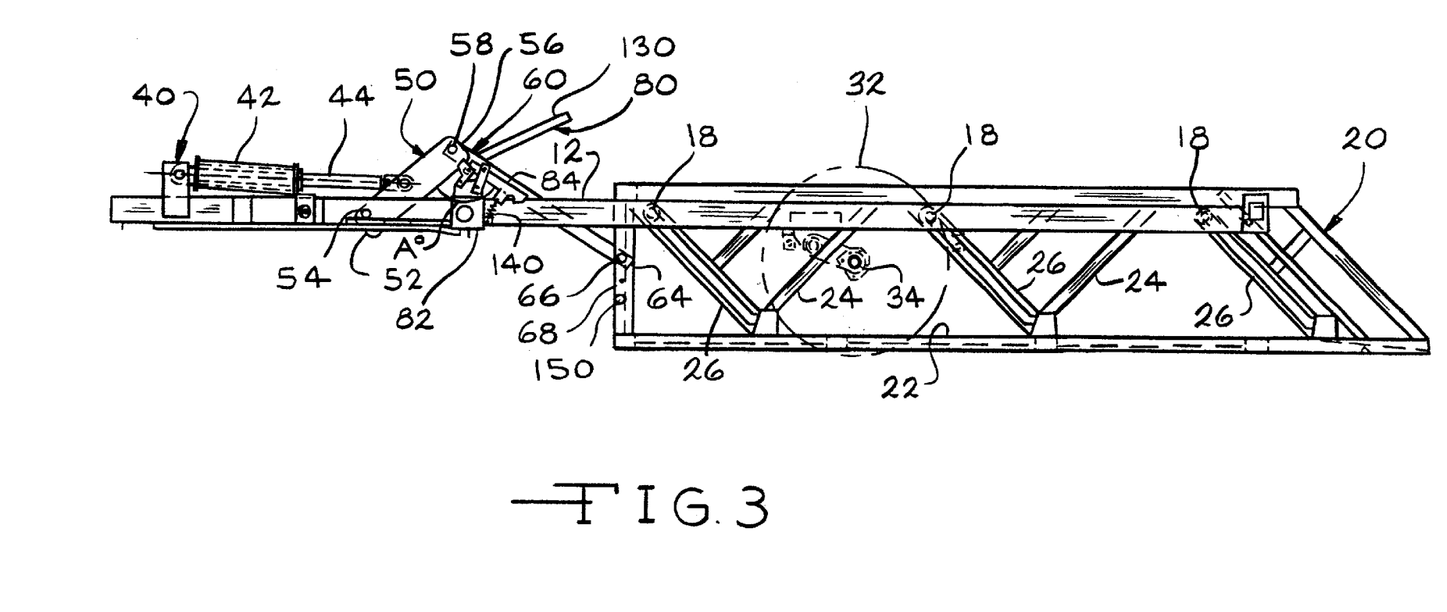
FIG. 3 is a side elevation view of a trailer in a second or lowered position.

At least one wheel and axle assembly 30 comprising a wheel 32 and axles 34 is operatively mounted to each longitudinally extending frame member 12. FIGS. 1–3 show the wheel 32 in phantom.

The trailer 10 further includes at least one lifting mechanism 40 which is operatively and pivotally mounted on the first end 16 of the frame members 14. The hydraulic cylinder lift mechanism 40 comprises a source of power such as a cylinder 42 having a rod or first end 44 that is connected to a lever 50 at a midpoint 51. The hydraulic cylinder lift mechanism 40 is operatively connected to a source of hydraulic fluid under pressure. The hydraulic fluid causes the rod 44 to advance and retract. The cylinder 42 is pivotally attached at a second or opposed end, 46 to the frame 11.

The lever 50 is operatively connected at a first end 52 to one of the frame members 14 by means of a pivot means 54. A second end 56 of the lever 50 is in a spaced apart relationship to the first end 52 and has a pivot means 58. A connecting bar 60 is operatively connected to the second end 56 of the lever 50. A first end 62 of the bar 60 is operatively mounted to the second end 56 by the pivot means 58. The connecting bar 60 has an opposed or second end 64 which is pivotally mounted by a pivot means 66 to an upright portion 68 of the bed 20.

Referring now to FIG. 3, the trailer 10 is shown in a down position. The rod 44 of the cylinder 42 is in an extended position. The lever 50 is rotated in a direction away from the cylinder means 40. The connecting bar 60 is in an extended position such that an interior angle A° which is defined between the lever 50 and the connecting bar 60 is at its greatest point, and in a preferred embodiment is greater than about 90°. The cam members 18 are positioned at a top portion of the cam follower tracks 26.

Referring now to FIGS. 1, 2 and 3, when the trailer bed 20 is to be moved to an elevated position, the hydraulic cylinder lift mechanism 40 is activated. The rod 44 retracts in a direction toward the cylinder 42 such that the lever 50 pivots about the pivot point 54 in a direction toward the hydraulic cylinder lift mechanism 40. The lever 50 and the connecting bar 60 pivot about the opposing pivot point 58, thereby decreasing the angle A° between the lever 50 and the connecting bar 60. The connecting bar 60 is attached to the bed 20 such that the greatest pressure is exerted at the beginning of the lift or elevation, rather than at the end or midpoint of the lift. This feature reduces the risk of overloading the trailer bed 20. It is not reasonably possible to partially raise loads in excess of the power ratings of the hydraulic cylinder lift mechanism 40.

As the cylinder rod 44 retracts and the lever 50 and the connecting bar 60 pivot, the bed 20 is pulled in an upward and forward direction toward the front or apex 16 of the trailer 10. As the bed 20 moves upwardly, the cam follower tracks 26 slide along the corresponding cam members 18. When the bed 20 is in a raised position, as shown in FIG. 1, the cylinder 42 has bottomed out, or is at the end of its stroke, and there is no more room to move. This acts as a safety feature to ensure that the bed 20 remains securely locked onto the frame 11.

Figures 8, 9, 10:
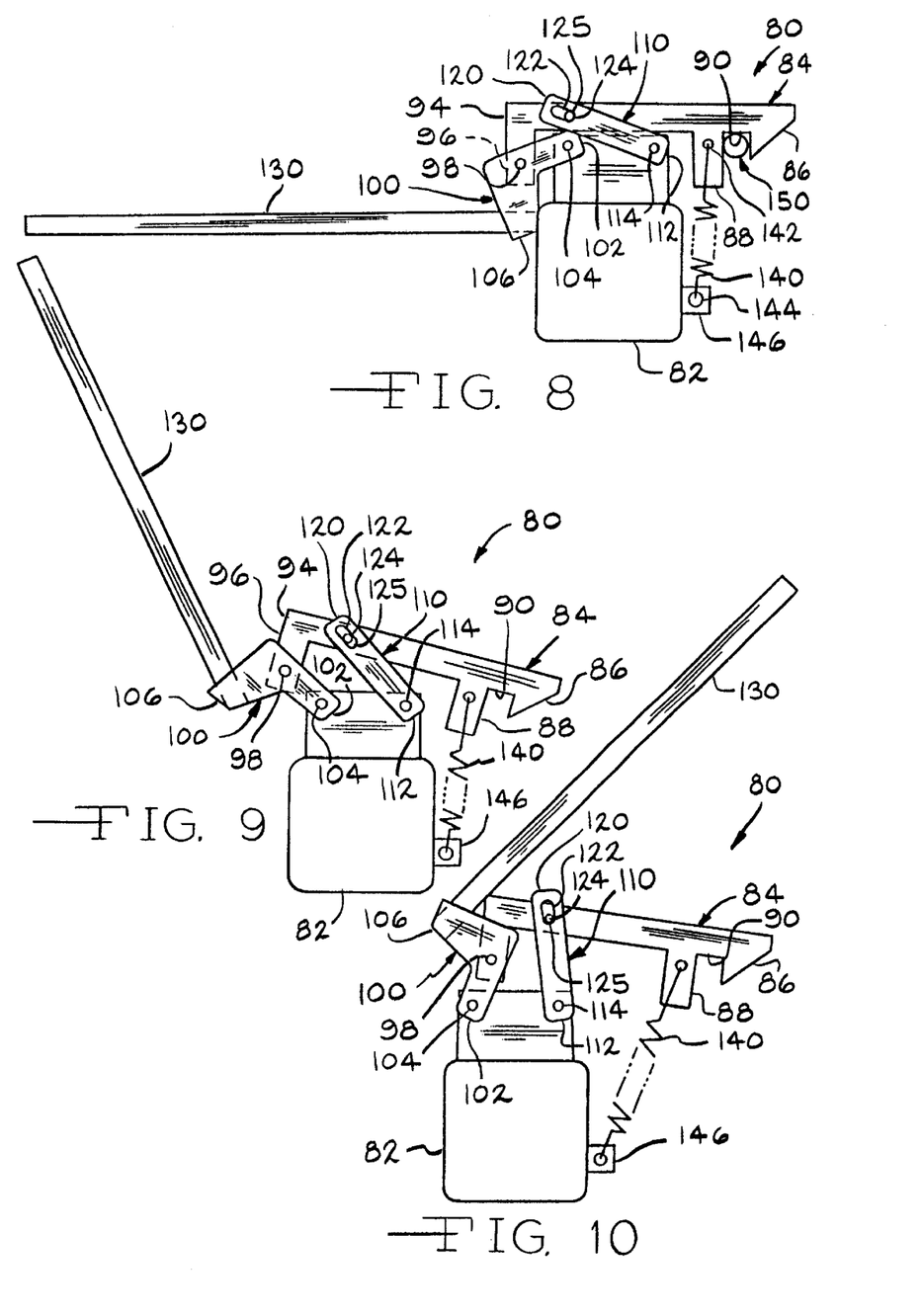
FIG. 8 is a side elevation schematic view of a locking mechanism in a first or locked position.
FIG. 9 is a side elevation schematic of a lock mechanism in a second or mid position.
FIG. 10 is a side elevation schematic view of a lock mechanism in a third or unlocked position.

Another safety feature is a securing mechanism 80, as best seen in FIGS. 8–10, which is positioned on a front supporting frame portion 82 of the frame 11. The securing mechanism 80 provides an "over-center" securing of the bed to the frame such that, in order to detach the securing mechanism, the securing mechanism must be rotated or pivoted through an angle greater than 90°. The front frame member 82 is substantially perpendicular to the longitudinally extending frame members 12. The securing mechanism 80 comprises a latch mechanism 84 having a slanted or cammed leading edge 86 and a rear engaging portion 88. The cammed surface 86 and the rear engaging portion 88 define an engaging notch 90. The latch 84 has a second end 94 which extends in an opposed direction from the cammed surface 86. The second end 94 has an extending portion 96 which extends in a parallel direction to the rear engaging surface 88 and defines a first pivot point 98.

The securing mechanism 80 includes a first pivot means 100 having a generally L-shape is operatively connected to a midpoint to the pivot point 98. The first pivot means 100 is also operatively connected at a first end 102 to the frame 82 by a second pivot point 104. The L-shaped pivot means 100 has a second end 106 which is in an opposed relationship to the pivot point 98 and the first end 102. A handle 130 is operatively connected to the second end 106 of the L-shaped pivot means 100.

The securing mechanism 80 also includes a second pivot means 110 having a first end 112 which is operatively connected by a pivot means 114 to the frame portion 82. The second pivot means 110 is in a spaced apart relationship to the first pivot means 100 and from the pivot point 104 which connects the first or L-shaped pivot means 100 to the frame portion 82. The pivot point 114 operatively connects the second pivot means 110 to the frame portion 82 such that the second pivot means 110 rotates about the pivot point 114. The second pivot means 110 has a second end 120 which defines a slot 122. The slot 122 operatively engages a pin or extending member 124 on the latch 84. The pin member 124 is adjacent the second end 94 of the latch 84.

The securing mechanism 80 further includes a spring or restraining mechanism 140 which is operatively connected at a first end 142 to the rear engaging portion 88 of the latch 84 and is operatively connected at a second end 144 to a lower portion 146 of the frame portion 82.

When the securing mechanism 80 is in a locked position, as shown in FIGS. 1 and 8, the engaging notch 90 engages a portion or bar 150 of the bed 20 which is mounted in a parallel relationship to the frame portion 82, as best seen in FIG. 1. The engaging bar 150 extends between the raised bed portions 68 in a generally perpendicular direction.

The securing mechanism 80 provides an "over-center" locking position such that the forces applied to the securing mechanism 80 must pivot the locking mechanism through greater than 90°. The "over-center" locking position ensures that the locking mechanism is securely held in place. In addition, as the latch 84 is moved to the locking position, the camming surface 86 slideably moves along the engaging bar 150 until the engaging bar 150 is in alignment with the engaging notch 90. The engaging bar 150 contacts the rear engaging portion 88 of the latch 84 and an audible "clicking" or "latching" sound is heard.

To operate the trailer 10 in a safe manner, the operator rotates the handle 130 in an upward direction such that the handle 130 and L-shaped pivot means 100 rotate about pivot points 98 and 104. The latch 84 also rotates about and slides along the slot 122 and the pivot point 114. The latch 84 rotates such that the engaging notch 90 is moved in a direction away from the engaging bar 150. The spring 140 is stretched such that the latch 84 is held in a taut but engaged position. The operator continues to rotate the handle 130 in an upward direction, as now shown in FIGS. 2 and 9 and when the locking mechanism 80 is in a fully unlocked position, as shown in FIGS. 3 and 10, the L-shaped pivot means 100 has further rotated about pivot points 104 and 98 while the second pivot means 102 has further rotated about pivot point 114. The pin member 124 has moved along the slot 120 to engage a lower portion 125 of the slot 122. The latch 84 is completely free of the engaging bar 150 and the spring 140 is in a further extended position.

Figure 4:
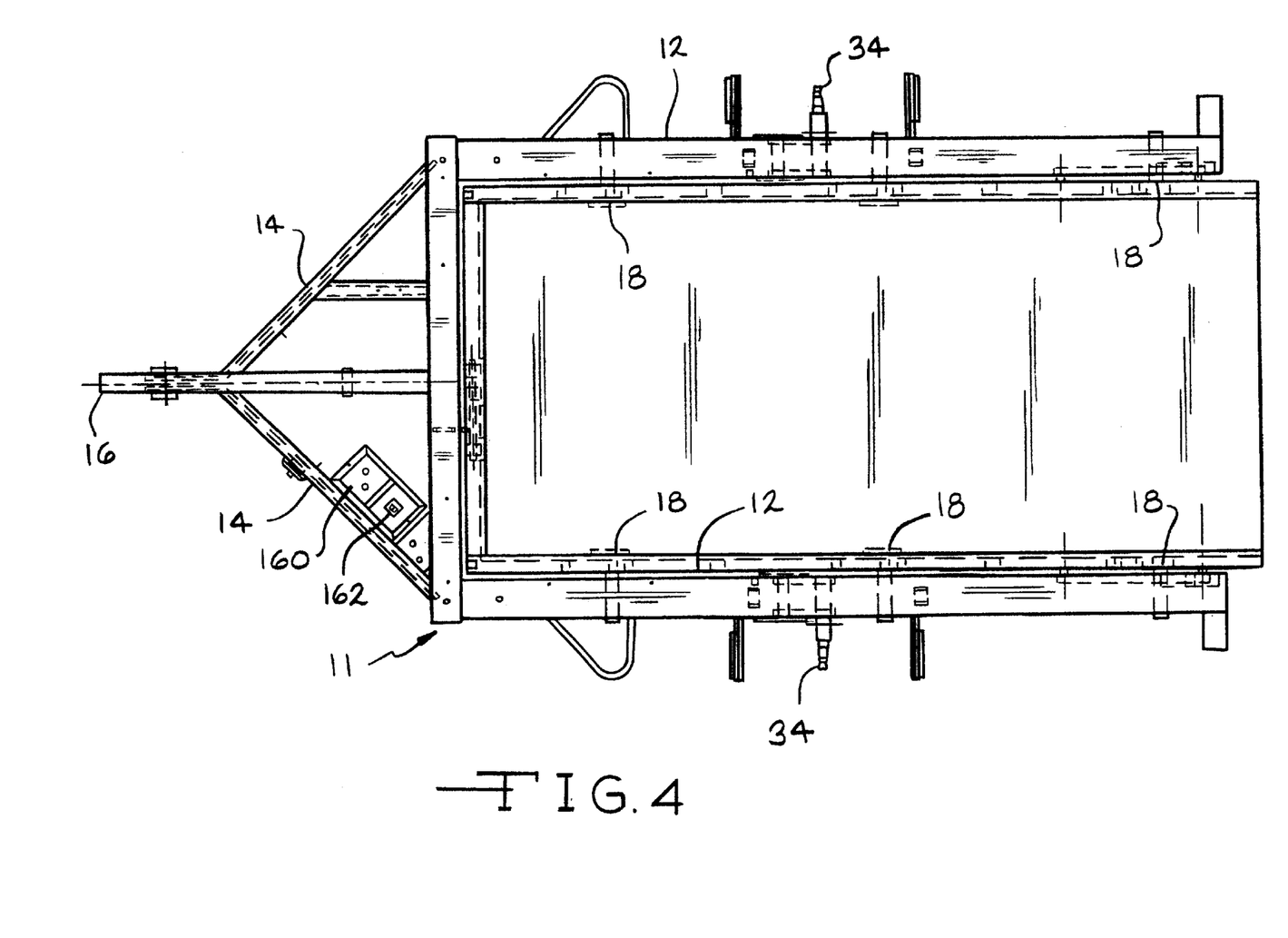
FIG. 4 is a plan view of a trailer frame.
Figure 5:
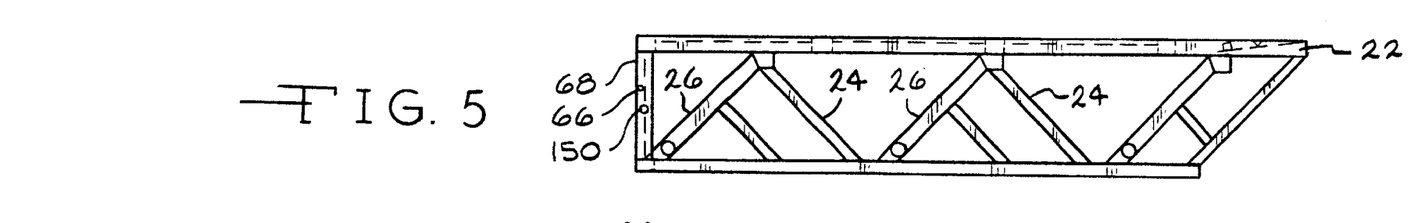
FIG. 5 is a side elevation view of one side of a trailer bed.
Figure 6:
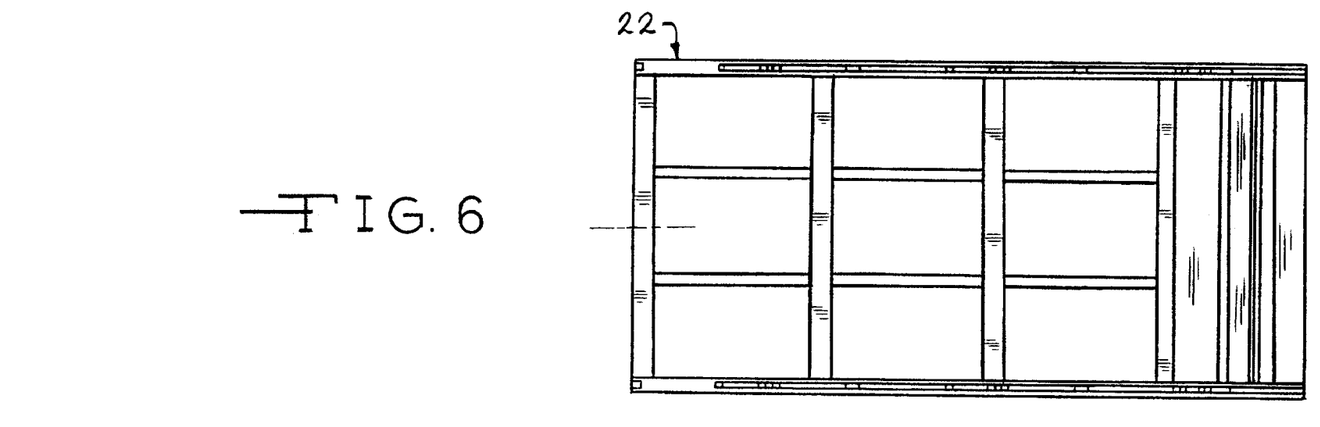
FIG. 6 is a plan view of a trailer bed.
Figure 7:
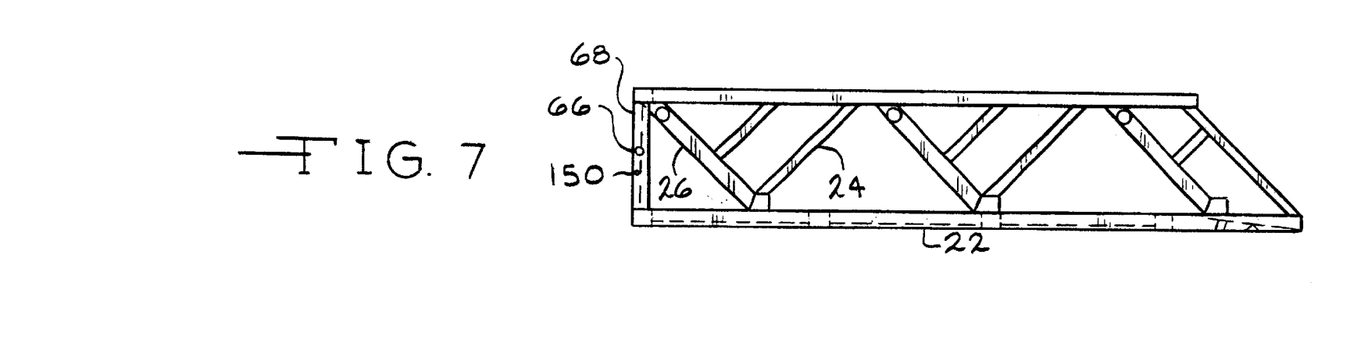
FIG. 7 is a side elevation view of another side of a trailer bed.

In order to operate the trailer a master power switch (not shown) is turned on in order to supply power to a battery 160, schematically shown in FIG. 4. The operator uses one hand to constantly hold an "up/down" switch 162 in a desired position. While using the other hand, the operator begins to rotate the handle 130 of the locking mechanism 80 in an upward direction, as described above. The operator keeps the first hand on the "up/down" switch 162, holding it in either an "up" or "down" position to engage the lift mechanism 40. In a preferred embodiment, the switch 162 must be held in position the entire time the bed 20 is in motion such that the operator's hands are safely out of any harms' way.

It should be understood that changes can be made with respect to the number and sizes of lift mechanisms and/or securing mechanisms without departing from the scope of this invention or from the following claims.

I claim:

1. A trailer (10) comprising
   a frame (11) having first and second longitudinally extending frame members (12) in opposed relationship, and a plurality of spaced apart cam members (18) on the frame members (12).
   a bed (20) operatively mounted to the frame (11), the bed (20) including a plurality of spaced apart cam follower tracks (26), each cam follower track (26) including a horizontal section (27) which is adjacent the bed (20), each of the cam follower tracks (26) engaging a corresponding cam member (18) on the frame (11), the bed (20) being capable of being moved or lifted from a first, or lowered, position to a second, or elevated, position in a substantially vertical and non-tilting manner,
   at least one lifting mechanism (40) operatively connected to the bed (20), the lifting mechanism (40) being mounted adjacent the bed in a substantially horizontal direction, the lifting mechanism applying a maximum force sufficient to lift the bed from the lowered position to the elevated position at the beginning of the lift rather than at an end or midpoint of the lift, the lifting mechanism being in a fully engaged position when the bed is in the second, or elevated, position and each cam member (18) is engaged in the corresponding horizontal section (27) of the corresponding cam follower track (26), and
   at least one securing mechanism (80) for securing the bed to the frame when the bed is in the second, or elevated, position.

2. The trailer of claim 1, wherein the lifting mechanism is operatively connected to the bed such that there is approximately a 2:1 mechanical disadvantage such that the potential power of the lifting mechanism is maximized.

3. The trailer of claim 2, wherein the lifting mechanism comprising a source of power (42) which is mounted in a generally parallel relationship with respect to the bed (20), a lever (50), and a connecting bar (60), the source of power (42) having a first end (44) which is pivotally attached to a midpoint (51) of the lever (50) and having a second end (48) which is pivotally attached to the frame (11), the lever (50) having a first end (52) which is pivotally attached to the frame (11) and a second end (56) which is pivotally attached to a first end (62) of the connecting bar (60), the connecting bar (60) having a second end (64) which is pivotally attached to the bed (20) such that the bed (20) is raised at the substantially 45° angle.

4. The trailer of claim 3, wherein the lever (50) and the connecting bar (60) define an interior angle greater than about 90° when the bed (20) is in the first, or lowered, position.

5. The trailer of claim 4, wherein the interior angle defined between the lever (50) and the connecting bar (60) decreases to the less than 90° as the bed is moved to the second, or raised, position.

6. The trailer of claim 3, wherein the source of power (42) of the lifting mechanism comprises a hydraulic cylinder and rod (44).

7. The trailer of claim 1, wherein the securing mechanism (80) provides an over-center locking position such that a force applied to the securing mechanism (80) must pivot the securing mechanism through an angle greater than a 90°.

8. The trailer of claim 7, wherein the securing mechanism (80) comprises a latch (84) which detachably engages a portion (150) of the bed (20) at a first end (88) and is pivotally connected at a second end (90) to a first L-shaped pivot means (100);

the first pivot means (100) operatively connected at a midpoint to second end (96) of the latch (84) by a first pivot point (98), the first pivot means (100) also being operatively connected at a first end (102) to a portion (82) of the frame (11) by a second pivot point (104), the first pivot means (100) having a second end (106) in opposed relationship to the pivot point (98) and the first end (102), wherein a handle (130) is operatively connected to the second end (106) of the first pivot means (100).

9. The trailer of claim 8, wherein the securing mechanism (80) further includes a second pivot means (110) in a spaced apart relationship from the first pivot means (100), the second pivot means (110) having a first end (112) operatively connected by a pivot point (114) to the frame portion (82), the pivot point (114) operatively connecting the second pivot means (110) to the frame portion (82) such that the second pivot means (110) rotates about the pivot point (114), the second pivot means (110) having a second end (120) which defines a slot (122) for receiving a pin or extending member (124) which extends from the latch (84).

10. The trailer of claim 9, wherein the securing mechanism (80) further includes a restraining mechanism (140) operatively connected at a first end (142) to the first end (88) of the latch (84) and operatively connected at a second end (144) to a lower portion (146) of the frame portion (82).

11. The trailer of claim 1, wherein the lifting mechanism (40) is operatively connected to a power supply (160) and an up/down switch (162) which is continually engaged in order to provide power from the power supply (160) to the lift mechanism (40) such that both the up/down switch (162) and a handle (130) of the securing mechanism (80) must be operated simultaneously in order to have the bed (20) move from the raised position to the lowered position.

12. The trailer of claim 1, wherein the bed is first caused to be raised by the lifting mechanism at a substantially 45° angle from the first, or lowered, position to the second, or raised, position and thereafter the bed is caused to be moved in a substantially horizontal direction toward a front end of the frame such that the potential power of the lifting mechanism is maximized.

\* \* \* \* \*